3,147,744
THERMAL POWER PLANT
Worth H. Percival, New Baltimore, Mich., assignor to General Motors Corporation, Detroit, Mich., a corporation of Delaware
Filed July 27, 1959, Ser. No. 829,689
9 Claims. (Cl. 122—33)

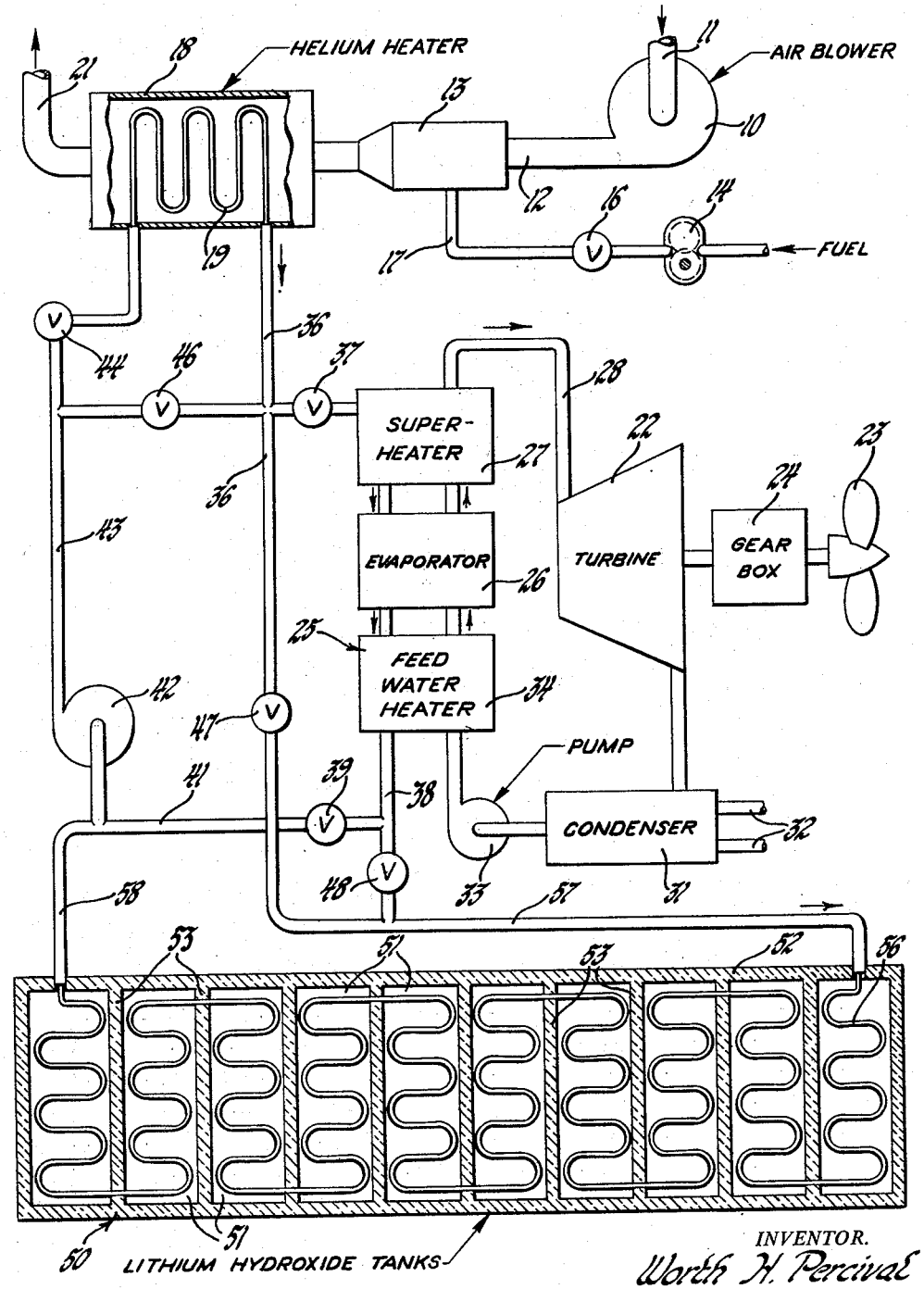

My invention is directed to thermal power plants; that is, those which convert heat energy into mechanical energy. It is particularly suited to the propulsion of submarines, but is applicable to other uses. The principal feature of the invention lies in improved means for storing heat energy for subsequent use.

The principal problem of submarine propulsion lies in providing adequate power and range for submerged cruising, when air is not available for operation of the usual combustion power plant such as a diesel engine, combustion boiler and steam turbine, or gas turbine. While other systems, such as underwater propulsion by hydrogen peroxide, have been tried to a limited extent, practically all submarines are propelled underwater by storage batteries and electric motors. Of course, a nuclear reactor does not require an air supply, but there remains a need for an improved underwater propulsion system for submarines which does not require air.

My invention provides a solution for this problem by combining a combustion power plant which may be used for surface cruising with improved means for storing energy in the form of heat in a heat sink. Heat may be stored by combustion when the vessel is surfaced and may be withdrawn from the heat sink or heat storage material to energize the power plant when the vessel is running submerged.

The invention is preferably embodied in a steam turbine power plant in which the water is heated by heat exchange from a circulated medium which is heated in a combustion heater. The heat exchange medium may be circulated through the heater and the heat sink to store heat, or it may be circulated through the heat sink and the boiler of the steam power plant to power the turbine when air is not available for combustion.

A feature of the invention lies in the provision of a heat sink provided by a considerable number of individual insulated containers of a heat storage medium which are connected in series for flow of the heat exchange medium through them, so that there is no great drop in the temperature of the heat exchange medium discharged from the heat sink until much the greater part of the stored heat has been withdrawn and utilized. Another feature of the invention lies in the selection of a superior heat storage medium. I have determined that lithium hydroxide is particularly suited to meeting the requirements of the sort of installation described; lithium hydride and lithium fluoride also have desirable characteristics. This matter will be enlarged upon later.

The nature of the invention and the advantages thereof will be apparent to those skilled in the art from the succeeding detailed description of the preferred embodiment of the invention.

The accompanying drawing is a schematic diagram of a power system embodying the invention, one particularly suited to propulsion of submarine vessels. The power system includes a combusion heater which may be of known type comprising an air blower 10 which may be driven by a suitable motor (not shown) and which draws air through an inlet pipe 11 and discharges it through a duct 12 into a combustion chamber 13. Fuel is supplied to the combustion chamber by any suitable means such as a pump 14, which may be driven by the same device as the blower 10, through a fuel regulator or valve 16 and the conduit 17 to the combustion chamber 13.

The resulting products of combustion flow through a heater 18 in which a suitable heat exchange medium is heated. The preferred heat exchange medium is helium, which is circulated through heating coils 19 in the heater 18. The combusion products are exhausted through a duct 21 to any suitable stack or vent. It will be apparent that the heater system just described may be the same as or similar to heaters employed in closed circuit gas turbines.

The vessel is propelled by a steam turbine 22 driving a propeller 23 through a reduction gear or gear box 24. Plural turbines and propellers may be employed if desired. Steam for operating the turbine is provided by an evaporator 26 and is superheated in a superheater 27. Steam from the superheater is supplied to the turbine through a line 28 which may be controlled by the usual valves and governors (not shown). The turbine exhaust steam flows into a condenser 31 through which cooling water may be circulated by a suitable pump (not shown) through lines 32. The condensate is returned to the evaporator by a pump 33 through a feed water heater 34. The feed water heater, evaporator, and superheater, while indicated schematically as separate elements, may be combined, and the three elements taken in conjunction may be referred to as a boiler 25. Heat is supplied to the water and steam in the boiler by circulating helium from the heater 18 through the boiler. Suitable heat exchange coils or tubes (not illustrated) may be provided in each of the units 26, 27 and 34 through which the helium is circulated to transfer heat to the water or steam.

The helium circuit for normal surface operation comprises the heating coil 19, a conduit 36, a valve 37, the heating coils in the superheater 27, evaporator 26, and feed water heater 34, the conduit 38, valve 39, a line 41, the helium blower or circulator 42, preferably driven by an electric motor, line 43, and valve 44 back to the heater 18. The helium circulates first through the superheater, then the evaporator, then the feed water heater. It will be apparent that valves 37, 39, and 44 are open in this mode of operation. A valve 46 which bypasses the heater 18, a valve 47 which bypasses the boiler, and a valve 48 are closed. The blower 42 circulates the helium through the heater, where it is raised to a high temperature, and through the boiler where it is cooled and generates the superheated steam to drive the turbine 22. It is contemplated that the maximum steam temperature be about 880° F., and the pressure about 700 p.s.i.a.

Energy for operating the boiler and turbine when the heater cannot be used is provided by a heat sink or reservoir 50 comprising a number of well-insulated containers 51 containing a suitable heat storage medium, preferably lithium hydroxide. These containers or tanks may be adjacent to each other, but are insulated against heat loss by insulating material 52 around the exterior of the tanks and insulated walls 53 between the tanks. The reason for minimizing heat transfer from one tank to another will be explained. As a matter of installation, the containers or tanks 51 may be built into a submarine in the below-deck space in which storage batteries are installed in electrically propelled submarines and in space formerly required for diesel engines and electrical propulsion equipment. The insulation may be highly effective. It has been calculated that an 8 inch layer of insulation can reduce heat loss to about one percent in 20 hours.

Each container 51 has mounted in it a heat exchange coil 56, all of the heat exchange coils being connected in series between a line 57 connected to the outlets of valve 47 and 48 and a line 58 leading to the inlet of helium blower 42.

Heat may be stored in the heat sink when air is available for combustion and the turbine 22 is not operating by opening valve 44 and closing valve 46 to direct the helium through the heater, opening valve 47 to bypass the boiler, and closing any two of valves 37, 39, and 48 to prevent flow through the boiler and prevent bypassing of the heat sink 50. A circuit is thus set up from the blower through valve 44, heater coil 19, line 36, valve 47, line 57, the sink 50, and back to the blower. The hot helium gas heats the lithium hydroxide or other storage material, heating initially the first unit 51 of the series, and successively heating them until all have been brought to substantially the temperature of the circulated helium.

It is also possible, when the vessel is cruising on the surface at a speed such that the heater output is greater than required to operate the turbine 22, to utilize part of the energy from the heater for operating the turbine and the remainder for recharging or reheating the heat sink. For this purpose, valves 46 and 48 may be closed and valves 44 and 39 open. Division of heat between the boiler 25 and the heat sink 50 may be accomplished by manipulation of valves 37 and 47. With this arrangement of the connections, the helium flows in parallel circuits through the boiler and heat exchanger, giving up heat to both.

When the vessel is submerged, the combustion heater is shut down, valves 44, 47 and 39 are closed, and valves 46, 37 and 48 are opened. A circuit is thus established from the heat exchangers 56 through line 58, blower 42, line 43, valves 46 and 37, boiler 25, valve 48, and line 57 back to the heat exchangers. The helium heated by the lithium hydroxide generates the steam to operate the turbine.

In any mode of operation, the rate of flow of the helium or other heat transfer medium may be kept at the desired rate by controlling the speed of blower 42 or in any other suitable way.

In view of the foregoing it will be apparent that the heater 18 with burner 13 is the original means for supplying heat to the power plant or aggregate illustrated in the figure. The heat sink or reservoir 50 is means for accumulating, that is, receiving, storing and releasing heat. The boiler 25 and turbine 22 comprise means for converting heat to mechanical energy. The boiler 25 or other device connected to absorb heat from the heater and heat sink for any useful purpose may be termed a heat receiver, the boiler 25 being merely the preferred form of heat receiver.

Because of the density and specific heat characteristics of lithium hydroxide or a comparable substance, a very considerable quantity of heat may be stored in a heat sink of such dimensions and weight that it may readily be substituted for the storage batteries of an electric submarine. In fact, the useful energy storage capacity of a heat sink using lithium hydroxide has been calculated to be from 20 to 28 times that of a storage battery installation which could be accommodated in the same vessel. An important reason for the high useful capacity, apart from the characteristics of the heat storage material, lies in the series arrangement. By virtue of this series arrangement of the individual containers and heat exchangers the heat exchange medium flowing to the boiler will remain at a high temperature until much the greater part of the usable heat has been taken from the storage means. This will be apparent upon considering the sequence of events, assuming that lithium hydroxide in all of the containers is at its maximum operating temperature and withdrawal of heat to operate the boiler and turbine is initiated. The relatively cool helium entering the heat sink through line 57 is heated substantially to its final temperature in the first heat exchanger of the series. The storage medium in the remaining containers remains substantially at its initial temperature. As the withdrawal of energy lowers the temperature materially in the first container, some heat will be taken from the second container. While a very slight amount of heat may be taken from each container in the series, each will remain nearly at its maximum temperature until the preceding containers have been reduced quite substantially in temperature. Even after this has occurred, the relatively low temperature heat storage medium in the first containers of the series will preheat the helium flowing to the later containers, which are still near full heat. As a result, the helium may be heated nearly to its maximum temperature until the last heat exchanger in the series begins to cool significantly. With ten containers and heat exchangers, as illustrated, it is calculated that over 90% of the total available heat may be withdrawn before the last tank becomes so cool that the steam cannot be maintained at the normal 880° F. operating temperature. Operation for a limited time at reduced power can be maintained beyond this point.

Of course, once this point has been reached the temperature of the helium decreases relatively rapidly; but the advantages of the series system are great in that the steam turbine power plant may be operated at high temperature and full efficiency until nearly all of the stored energy has been withdrawn.

It is obvious that valves 44 and 46 which control flow through the helium heater may be combined into a single three-way valve.

The same is true of valves 37 and 47 which control flow through the boiler and of valves 39 and 48 which control flow through the heat reservoir.

It may be desirable to provide a simple valve arrangement providing for reversing the direction of flow of the helium through the heat reservoir 50; in other words, reversing the order in the flow series of the individual containers 51. This provision would make it possible to draw helium at substantially the maximum temperature from the heat sink for submerged operation even though previous recharging had been incomplete so that the individual storage units 51 at one end of the series remained relatively cool.

It will also be apparent that the heat storage principles of the invention may be employed with heat engines or power plants other than boiler and steam turbine power plants. For example, the helium could be used as a heating medium in a Stirling cycle engine or a closed circuit gas turbine.

It is believed that the foregoing description covers the structure and operation of the system, and it is in order to discuss the considerations which make a material most suitable for storage of heat in the applicant's system. The most important characteristics are the following:

(1) *High heat capacity.*—This may be summarized as the amount of heat liberated by unit weight of the substance in cooling from the maximum temperature to the minimum usable temperature. The preferable maximum temperature will be about 1500° F. because of strength losses of tanks, conduits, etc. at higher temperatures. The minimum temperature may be about 350° F. The heat capacity is a function of the average specific heat over the usable temperature range, and it is desirable that the specific heat be as high as possible, particularly in the higher temperature ranges. A high heat of fusion also contributes to the heat release. A substance which fuses near the maximum temperature is preferable. If fusion occurs near the maximum temperature, a greater quantity of heat will be liberated before there is a very great drop in temperature, which is desirable.

(2) The *melting point* of the substance is significant. For the reasons pointed out in the preceding paragraph, it is best for the melting point to be near the maximum cycle temperature. If the melting point is low, the heat of fusion will be recovered only at a low temperature. If the melting point is above the maximum cycle temperature, there will be no gain from the heat of fusion. It is also desirable that the material melt at a low enough temperature so that it may be readily melted and compacted after being poured into the storage containers.

(3) The material should have a *low vapor pressure* at the maximum operating temperature so that a strong pressure vessel is not required to contain it. Preferably, maximum vapor pressure should be less than ambient atmospheric pressure.

(4) *Physical and chemical stability* are important. The material should be nonexplosive and should withstand many heating and cooling cycles without changing characteristics or decomposing.

(5) *Inertness to air.*—The material should not react violently with the atmosphere or with moisture in the air if accidentally exposed at high temperature.

(6) *Low corrosiveness.*—A desirable property is lack of corrosive effects upon the container and heat exchange tubes. It is of practical importance that the material be such that inexpensive, readily usable, and nonstrategic materials may be used in contact therewith.

(7) *High density* of the material is desirable primarily as a matter of conservation of space. In some installations, the quantity of storage material that may be used may be limited by the amount of weight which can be carried. However, in other installations the volume available for storage may be the limiting factor, and a material of high density will require less space. Also, the weight and expense of the containers for the material decreases as the volume is reduced. It will be apparent that the factors of heat capacity for unit weight and density may be correlated in a combined factor of heat storage capacity for unit volume.

(8) *Cheapness* and *abundance* of the heat storage material are also important for practical reasons.

Evaluation of various possible heat storage substances in the light of the criteria set out above show that three lithium compounds are particularly promising for this purpose. These are lithium hydroxide, lithium hydride, and lithium fluoride. Of the three, the hydroxide seems most suitable, particularly where submarine propulsion is concerned. LiOH has a high specific heat and heat of fusion and a reasonably high melting temperature, 884° F. The other two compounds have even higher heat of fusion and melting point. LiH has a higher specific heat than LiOH, while LiF has a lower. The melting point of LiF, 1560° F., is rather high for practical use, although not high enough to disqualify it for some applications. All these compounds have vapor pressures below atmospheric at the contemplated operating temperatures.

The hydride would be dangerous in a submarine because of hydrogen diffusion through most metals at high temperatures, but this may be an inconsiderable factor in other applications.

The merits of the three lithium compounds are tabulated below in terms of the eight factors set out above, based upon present knowledge. In the tabulation, E is excellent, G is good, F is fair, and P is poor.

| Item | LiOH | LiH | LiF |
| --- | --- | --- | --- |
| 1. Heat Capacity | G | E | G |
| 2. Melting Point | G | F | P |
| 3. Vapor Pressure | E | G | E |
| 4. Stability | G | F | E |
| 5. Inertness to Air | E | P | E |
| 6. Low Corrosiveness | F | G | G or E |
| 7. Density | G | F | E |
| 8. Cost and Abundance | E | P | G |

The advantages of the power plant disclosed herein will be apparent to those skilled in the art. The greatest advantage is an improvement of 20 to 28 times in the energy available for cruising when submerged over a Diesel engine, electric motor-generator, and storage battery propulsion system of equivalent weight and space requirements. Also, the installation eliminates dangers of hydrogen or chlorine release from storage batteries.

While particularly desirable for submarines, my power plant is usable in other situations where storage of energy for standby purposes or for temporary emergency use may be desirable. The power plant is capable of continuous operation from an intermittently available source of heat energy. Another field of use would be in devices such as locomotives or vehicles which operate at times in conditions where fire is a hazard and combustion engines are dangerous.

The description of the preferred embodiment of the invention, for the purpose of explaining the principles thereof, is not to be considered as limiting or restricting the invention, as many modifications may be made by the exercise of skill in the art within the scope of the invention.

I claim:

1. A power system adapted to be connected to and for supplying heat to a heat-energized power plant, the system comprising, in combination, a combustion heater, a plurality of insulated containers each insulated from each other containing a suitable heat storage medium, a heat exchanger in each container, the heat exchangers being connected in series, a heat receiver, means for circulating a heat exchange medium, and valve means operable to circulate the heat exchange medium alternatively through the heater and the heat receiver, or through the heater and the heat exchangers, or through the heat exchangers and the heat receiver.

2. A power system as recited in claim 1 in which the heat storage medium is a suitable lithium compound.

3. A power system as recited in claim 1 in which the heat storage medium is a compound selected from the group consisting of lithium hydroxide, lithium hydride, and lithium fluoride.

4. A power system as recited in claim 1 in which the heat storage medium is lithium hydroxide.

5. A power system as recited in claim 1 in which the heat storage medium is lithium hydride.

6. A power system as recited in claim 1 in which the heat storage medium is lithium fluoride.

7. A power system connected to and for supplying working medium to a vapor engine comprising, in combination, a combustion heater, a boiler, a plurality of insulated containers each insulated from each other containing a heat storage medium, a heat exchanger in each container, the heat exchangers being connected in series, means for circulating a heat exchange medium, and valve means operable to circulate the heat exchange medium alternatively through the heater and the boiler, or through the heater and the heat exchangers, or through the heat exchangers and the boiler.

8. A power system adapted to be connected to and for supplying heat to a heat-energized power plant, the system comprising, in combination, a combustion heater, a heat sink comprising a plurality of insulated containers each insulated from each other containing heat storage medium and a heat exchanger in each container, the heat exchangers being connected in series, a heat receiver, means for circulating a heat exchange medium through the heater, the heat receiver, and the heat sink in series, and means for bypassing the medium around any one of the heater, the heat receiver, and the heat sink.

9. A power system for supplying working medium to a vapor engine comprising, in combination, a combustion heater, a boiler, a heat sink comprising a plurality of insulated containers each insulated from each other containing a heat storage medium and a heat exchanger in each container, the heat exchangers being connected in series, a closed circuit connecting the heater, the boiler, and the heat sink in series, means in the circuit for circulating the heat exchange medium through the circuit, the circuit including means for bypassing any one of the heater, the boiler, and the heat sink.

References Cited in the file of this patent

UNITED STATES PATENTS

| | | |
|---|---|---|
| 1,226,220 | Kasley | May 15, 1917 |
| 1,659,836 | Ruths | Feb. 21, 1928 |
| 1,959,286 | Grebe | May 15, 1934 |
| 2,162,746 | Randel | June 20, 1939 |
| 2,808,494 | Telkes | Oct. 1, 1957 |

OTHER REFERENCES

Ser. No. 134,706, Gilli (A.P.C.), published May 11, 1943.